(12) United States Patent
Van Nee

(10) Patent No.: US 8,111,607 B2
(45) Date of Patent: *Feb. 7, 2012

(54) FREQUENCY DIVISION MULTIPLEXING SYSTEM WITH SELECTABLE RATE

(75) Inventor: D. J. Richard Van Nee, De Meern (NL)

(73) Assignee: MOSAID Technologies Incorporated, Ottawa (CA)

( * ) Notice: Subject to any disclaimer, the term of this patent is extended or adjusted under 35 U.S.C. 154(b) by 2000 days.

This patent is subject to a terminal disclaimer.

(21) Appl. No.: 11/156,140

(22) Filed: Jun. 17, 2005

(65) Prior Publication Data

US 2005/0232134 A1    Oct. 20, 2005

Related U.S. Application Data

(63) Continuation of application No. 10/410,375, filed on Apr. 9, 2003, now Pat. No. 6,992,972, which is a continuation of application No. 09/224,695, filed on Jan. 4, 1999, now Pat. No. 6,563,786.

(30) Foreign Application Priority Data

Jan. 6, 1998    (EP) .................................... 98200010

(51) Int. Cl.
    *H04J 11/00*    (2006.01)
(52) U.S. Cl. ......................................... 370/208; 370/210
(58) Field of Classification Search .................. None
    See application file for complete search history.

(56) References Cited

U.S. PATENT DOCUMENTS

| | | | |
|---|---|---|---|
| 5,291,289 A * | 3/1994 | Hulyalkar et al. | 348/723 |
| 5,600,672 A | 2/1997 | Oshima et al. | |
| 5,694,389 A | 12/1997 | Seki et al. | |
| 5,726,978 A | 3/1998 | Frodigh et al. | |
| 5,732,113 A * | 3/1998 | Schmidl et al. | 375/355 |
| 5,818,813 A | 10/1998 | Saito et al. | |
| 5,862,189 A * | 1/1999 | Huisken et al. | 375/341 |

(Continued)

FOREIGN PATENT DOCUMENTS

EP    0 589 709 A    3/1994

(Continued)

OTHER PUBLICATIONS

Larsson, et al., "Mixed Traffic in a Multicarrier System," IEEE Vehicular Technology Conference, pp. 1259-1263, 1996.

(Continued)

*Primary Examiner* — Phirin Sam

(74) *Attorney, Agent, or Firm* — Hamilton, Brook, Smith & Reynolds, P.C.

(57) ABSTRACT

An OFDM system uses a normal mode which has a symbol length T, a guard time TG and a set of N sub-carriers, which are orthogonal over the time T, and one or more fallback modes which have symbol lengths KT and guard times KTG where K is an integer greater than unity. The same set of N sub-carriers is used for the fallback modes as for the normal mode. Since the same set of sub-carriers is used, the overall bandwidth is substantially constant, so alias filtering does not need to be adaptive. The Fourier transform operations are the same as for the normal mode. Thus fallback modes are provided with little hardware cost. In the fallback modes the increased guard time provides better delay spread tolerance and the increased symbol length provides improved signal to noise performance, and thus increased range, at the cost of reduced data rate.

64 Claims, 2 Drawing Sheets

U.S. PATENT DOCUMENTS

| | | | |
|---|---|---|---|
| 5,892,879 A | | 4/1999 | Oshima |
| 5,909,436 A | | 6/1999 | Engstrom et al. |
| 5,959,980 A | | 9/1999 | Scott |
| 5,963,592 A | | 10/1999 | Kim |
| 6,005,840 A | * | 12/1999 | Awater et al. ............. 370/206 |
| 6,018,528 A | | 1/2000 | Gitlin et al. |
| 6,038,275 A | | 3/2000 | Taura et al. |
| 6,038,450 A | | 3/2000 | Brink et al. |
| 6,088,327 A | | 7/2000 | Muschallik et al. |
| 6,091,702 A | | 7/2000 | Saiki |
| 6,115,354 A | | 9/2000 | Weck |
| 6,137,847 A | | 10/2000 | Stott et al. |
| 6,219,334 B1 | | 4/2001 | Sato et al. |
| 6,314,083 B1 | | 11/2001 | Kishimoto et al. |
| 6,359,938 B1 | | 3/2002 | Keevill et al. |
| 6,452,977 B1 | | 9/2002 | Goldston et al. |
| 6,546,055 B1 | * | 4/2003 | Schmidl et al. ............. 375/244 |
| 6,563,786 B1 | * | 5/2003 | Nee ............................. 370/208 |
| 6,628,730 B1 | | 9/2003 | Stott et al. |
| 6,992,972 B2 | | 1/2006 | Nee |
| 7,145,971 B2 | * | 12/2006 | Raleigh et al. ............. 375/347 |

FOREIGN PATENT DOCUMENTS

| | | | |
|---|---|---|---|
| EP | 0 762 701 A2 | | 3/1997 |
| EP | 0 589 702 B1 | | 5/1999 |
| EP | 0 929 172 A1 | | 7/1999 |
| JP | 7-273741 A | | 10/1995 |
| JP | 10-22973 | | 1/1998 |

OTHER PUBLICATIONS

Rasmussen, et al., "A Unifying Discrete-Time Model for Direct Sequence and Multicarrier Variable Rate Broadband CDMA," Seventh IEEE International Symposium on Personal, Indoor and Mobile Radio Communications, vol. 3, pp. 1111-1115, 1996.

Okada, et al., "Wideband Indoor Radio System Using Orthogonal Multicarrier Modulation," IEEE International Conference on Systems Engineering, pp. 457-462, 1992.

Takanashi, H., et al., "Summary of Merged Proposal," Doc: IEEE P802.11-98/72a, pp. 1-5, 1998.

Van Nee, R., et al., "Sharing Performance Evaluation for TGa PHY Submission," Doc: IEEE P802.11-98/71r1, pp. 1-5, 1998.

Van Nee, R., et al., "OFDM Physical Layer Specification for the 5 GHz Band," Doc: IEEE P802.11-98/12, pp. 1-12, 1998.

Van Nee, R., et al., "Scaleable OFDM Radio Parameters," Doc: IEEE P802.11-97/92, pp. 1-12, 1997.

Van Nee, R., "OFDM for High Speed Wireless Networks," Doc: IEEE P802.11-97/123, pp. 1-15, 1997.

Moose, P, H., "A Technique for Orthogonal Frequency Division Multiplexing Frequency Offset Correction," IEEE Transactions on Communication, vol. 42, No. 10, pp. 2908-2914, 1994.

Van Nee, R., et al., "OFDM Codes for Peak-to-Average Power Reduction and Error Correction," IEEE 0/7803-3336-5/96, pp. 740-744, 1996.

Bingham, J A.C., "Multicarrier Modulation for Data Transmission: An Idea Whose Time Has Come," IEEE Communication Magazine, pp. 5-14, 1990.

European Telecommunications Standard ETS 300 401, Second Edition, "Radio Broadcasting Systems: Digital Audio Broadcasting (DAB) to Mobile, Portable and Fixed Receivers," pp. 1-206, 1997.

Takanashi, H., et al., "Merged OFDM Physical Layer Specification for the 5 GHz Band," Doc: IEEE P802.11-98/72r1, pp. 1-27, 1998.

Van Nee, R., "OFDM Performance Comparison Submission Template," Doc: IEEE 802.11-98/73, pp. 1-2, 1998.

Memorandum and Order issued Jul. 20, 2004 in Civil Action Docket No. 3-3138, United District Court for the Eastern Division of Pennsylvania, pp. 1-104 (Markman decision interpreting claims for parent of instant application).

Aldis, J.P., et atl., "Physical Layer Architecture and Performance in the WAND User Trial System," ACTS Mobile Telecommunications Summit, pp. 196-203, 1996.

Van Nee, R., et al., "OFDM Wireless Multimedia Communications," Artech House Publishers, pp. 20-23, 229-230, 2000.

Aldin, J., et al., "Magic Into Reality, Building the WAND Modem," Publication Unknown, pp. 775-780.

Hadara H. and Prasad R., "Performance Analysis of an OFDM Based Wireless ATM Communication System," *Proc. PIMRC 1997*, pp. 1095-1099, Sep. 1997.

Uehara, M., et al., "A Study of Terrestrial ISDB Systems: BST-OFDM Schemes and Multiplexing," *ITE Technical Report* vol. 2, No. 22, pp. 23-28, Mar. 15, 1996.

Takanashi, H., et al., "Outline of Draft Standard for 5 GHz," *IEEE 802.11-98/272*, pp. 1-8, Jul. 1998.

Kaitz, T., "TGa Preamble Improvement Proposal," *IEEE 802.11-98/308*, pp. 1-3, Sep. 1998.

Kaitz, T., and Chayat, N., "TGa Preamble Improvement Proposal," *IEEE 802.11-98/369*, pp. 1-7, Nov. 1998.

European Search Report dated Jul. 3, 1998, for EP Application No. 98 20 0010.

\* cited by examiner

FREQUENCY DIVISION MULTIPLEXING SYSTEM WITH SELECTABLE RATE

This is a continuation of application No. Ser. No. 10/410,375, filed Apr. 9, 2003, now issued as U.S. Pat. No. 6,992,972, which is a continuation of application Ser. No. 09/224,695, filed Jan. 4, 1999, now issued as U.S. Pat. No. 6,563,786.

CROSS-REFERENCE TO RELATED APPLICATION

This application claims priority of European Patent Application No. 98200010.1, which was filed on Jan. 6, 1998.

BACKGROUND OF THE INVENTION

1. Field of The Invention

This invention relates to communication systems and, more particularly, OFDM (Orthogonal Frequency Division Multiplexing) modulation schemes.

2. Description of Related Art

OFDM is a block-oriented modulation scheme that maps N data symbols into N orthogonal sub-carriers separated by a frequency interval of 1/T, where T is the symbol duration, i.e. the time period over which the sub-carriers are orthogonal. As such, multi-carrier transmission systems use OFDM modulation to send data bits in parallel over multiple sub-carriers (also called tones or bins). An important advantage of multi-carrier transmission is that inter-symbol interference due to signal dispersion (or delay spread) in the transmission channel can be reduced or even eliminated by inserting a guard time interval $T_G$ between the transmission of subsequent symbols, thus avoiding an equalizer as required in single carrier systems. This gives OFDM an important advantage over single carrier modulation schemes. The guard time allows delayed copies of each symbol, arriving at the receiver after the intended signal, to die out before the succeeding symbol is received. OFDM's attractiveness stems from its ability to overcome the adverse effects of multi-channel transmission without the need for equalization.

The transformations between blocks of symbols and baseband carrier signal are normally carried out using fast Fourier transform (FFT) techniques. A discussion of OFDM is given by Alard and Lasalle, EBU Technical Review, no. 224, August 1987, pages 168-190.

A need exists for a flexible OFDM system which provides the advantages of OFDM to a variety of communication environments.

In a previous patent application (U.S. Ser. No. 08/834,684, herein referred to as VN) I disclosed several techniques to scale data rates using OFDM. Scaling methods involve changing the clock rate, FFT size, coding rate, constellation size and guard time.

The present invention is intended to provide fallback rates with a minimum change in hardware.

SUMMARY OF THE INVENTION

An orthogonal frequency division multiplexing communications apparatus employs a set of sub-carriers, which are orthogonal over a time T, and symbols expressed by superpositions of the sub-carriers.

The apparatus is configured to selectively operate in one of a plurality of signaling modes in each of which the duration of each symbol is KT, where K is a positive integer, and different modes have different values of K and the same set of sub-carriers. The symbols may be associated with guard times, each of which has a length $KT_G$, where $T_G$ is the same for all of the signalling modes. Thus, signaling modes with greater values of K may have greater guard time lengths.

In one embodiment of the present invention, a first signaling mode (the 'normal' mode) uses a symbol length T, a guard time $T_G$ and a set of N sub-carriers and a second mode (the 'fallback' mode) uses a symbol length KT, a guard time $KT_G$ and the same set of N sub-carriers, where K is an integer greater than unity.

The technique can increase the range and delay spread tolerance without substantially changing the bandwidth and without changing the FFT size, at the cost of a decreased bit rate. Further, the fallback rates can also be used to provide a multiple access capability, so using fallback rates does not necessarily result in a bad spectral efficiency.

DETAILED DESCRIPTION

Figure 1:
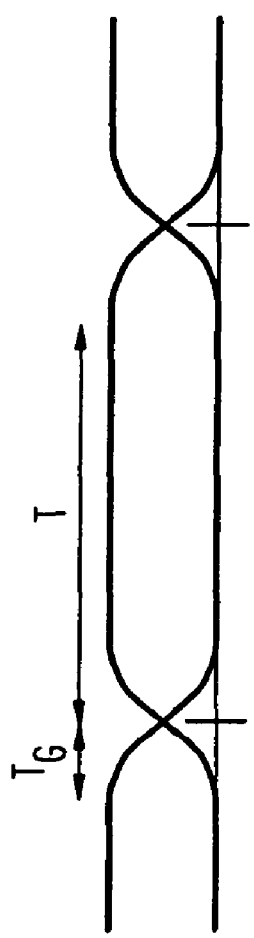
FIGS. 1 and 2 illustrate the transmission of an OFDM symbol in K=1 mode and K=2 mode according to the invention.

FIG. 1 shows an OFDM symbol transmitted with a symbol duration T and a guard time $T_G$. The object of the guard time $T_G$ is to accommodate any interference between consecutive symbols due to dispersion or multi-path interference (collectively referred to as 'delay spread'), and to leave a time T over which the symbol can be received free from such interference. Under some conditions, or in some applications, it may happen that the guard time $T_G$ is insufficient to accommodate this delay spread (as in FIG. 1). It may also happen that a greater range will be required, i.e. a higher signal-to-noise ratio in the recovered signal. Simply increasing the guard time $T_G$ would accommodate a larger delay spread, though it would not affect the range. Decreasing the clock rate seems a simple way of increasing the guard time $T_G$ and the symbol duration T, but it would also decrease the frequency spacing 1/T between the sub-carriers. This would proportionately decrease the overall bandwidth of the channel, which would mean that the filters that are required to remove aliases would have to be adaptable, thus increasing the hardware requirement.

Figure 2:
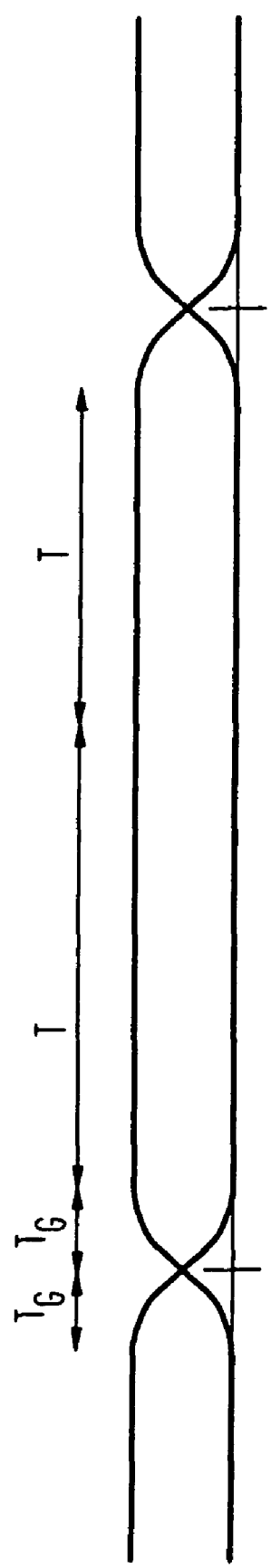

FIG. 2 shows a symbol which has been transmitted with twice the symbol duration 2T and with twice the guard time $2T_G$. The guard time is now doubled, and can accommodate the illustrated intersymbol interference. Also, since the symbol duration is doubled, the signal-to-noise performance, and hence the range, is improved. It is important to note that the frequencies of the sub-carriers are not also halved as would be the case with a simple halving of the clock rate. The same set of sub-carriers is used, still separated by 1/T, not 1/2T. Therefore, the overall bandwidth of the channel, which is mainly determined by the spread of subcarrier frequencies, and only to a much lesser extent by the widths of the individual sub-carriers, is substantially unchanged.

Since for any OFDM symbol, the signal repeats itself after T seconds, where T is the FFT interval, it is possible to do 2 FFTs on two different parts of the received symbol, each with a length of T seconds. Since both FFT outputs carry the same data, but different noise, they can be averaged to get a 3 dB increase in signal-to-noise ratio. The FFT is a linear operation, so it is also possible to first average two T seconds intervals and use this averaged signal as input to a single FFT. This scheme can easily be extended to other data rates; in general, any rate which is a factor K less than the highest bit rate can be produced by extending the symbol duration by a factor of K. By taking K FFTs per symbol, a processing gain of K is achieved which increases the range. At the same time, the delay spread tolerance is increased by a factor of K. The only extra hardware required is for averaging K consecutive signal intervals of T seconds. In fact, the amount of processing in terms of operations per second is decreased for fallback rates, because the averaging takes far less processing than the FFT. Consider, for instance, the case of an OFDM modem with a 64 point FFT and a symbol duration of 2 µs. A 64 point FFT involves about 192 complex multiplications and additions, so the processing load is 96 Mops, where an operation is defined as one complex multiply plus one addition. If the symbol duration is doubled to create a fallback rate, then in 4 µs, 64 additions have to be performed plus one 64 point FFT. Thus, the processing load becomes (192+64)/4 µs=64 Mops. In fact, this figure is pessimistic, because the extra additions have been given the same weight as multiplications, while they are significantly less complex when implemented in hardware. The additions are the only part of the receiver that has to run at the full clock rate; the FFT and everything following the FFT (channel estimation, decoding) can run at a rate that is K times lower than the original rate, which helps to reduce the power consumption.

Figure 3:
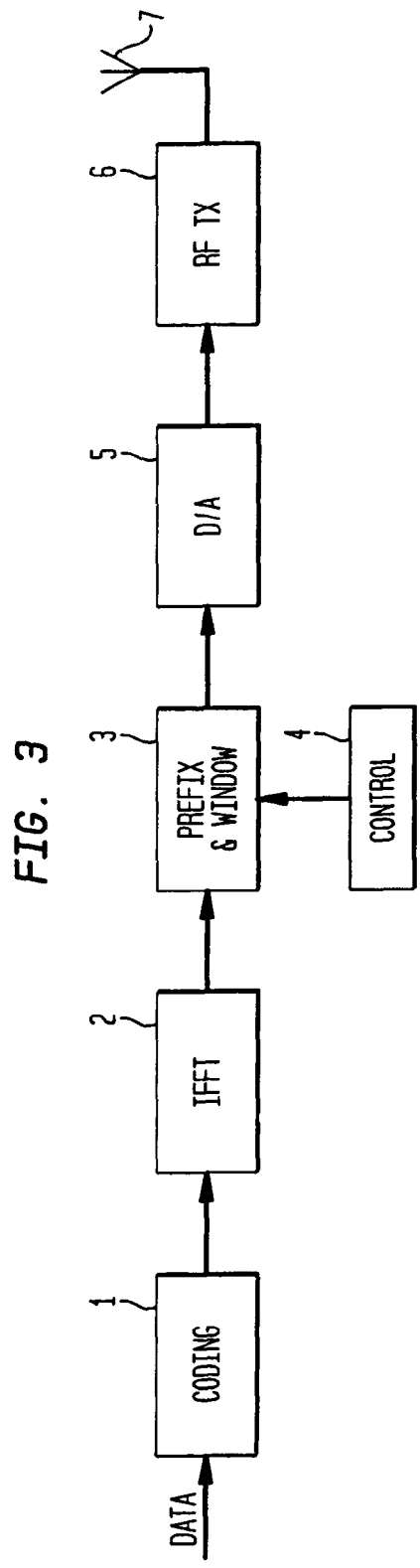
FIG. 3 shows, in block schematic form, a transmitter embodying the invention.

FIG. 3 shows an OFDM transmitter which receives a stream of data bits. A coding circuit 1 receives the data stream and partitions it into successive groups or blocks of bits. The coding circuit 1 introduces redundancy for forward error correction coding.

The blocks of coded data bits are input into an N-points complex IFFT (Inverse Fast Fourier Transform) circuit 2 where N is in the number of the OFDM subcarriers. In this particular embodiment, using quaternary phase-shift keying (QPSK), the IFFT is performed on blocks of 2N coded data bits received from the coding circuit 1. In practice, the transmitter has to use oversampling to produce an output spectrum without aliasing which introduces unwanted frequency distortion due to (intended or unintentional) low pass filtering in subsequent stages of the transmitter or in the transmission channel. Thus, instead of an N-points IFFT and M-points IFFT is actually done where M>N to perform the oversampling. These 2N bits are converted into N complex numbers, and the remaining M−N input values are set to zero.

To decrease the sensitivity to inter-symbol interference, the cyclic prefixer and windowing block 3 copies the last part of the OFDM symbol and augments the OFDM symbol by prefixing it with the copied portion of the OFDM symbol. This is called cyclic prefixing. Control circuitry 4 controls the cyclic prefixer and windowing block 3 to switch the guard time and the symbol duration as required, or as appropriate, between their normal values $T_G$ and T respectively and their fallback values $KT_G$ and KT respectively. To provide the fallback values the cyclic prefixer has to augment the OFDM symbol with K−1 copies of itself, in addition to the prefix, which is preferably K times as long as the normal prefix.

To reduce spectral sidelobes, the cyclic prefixing and windowing block 3 performs windowing on the OFDM symbol by applying a gradual roll-off pattern to the amplitude of the OFDM symbol. The OFDM symbol is input into a digital-to-analogue converter after which it is sent to a transmitter front-end 6 that converts the baseband wave form to the appropriate RF carrier frequency in this particular embodiment for transmission from antenna 7.

Figure 4:
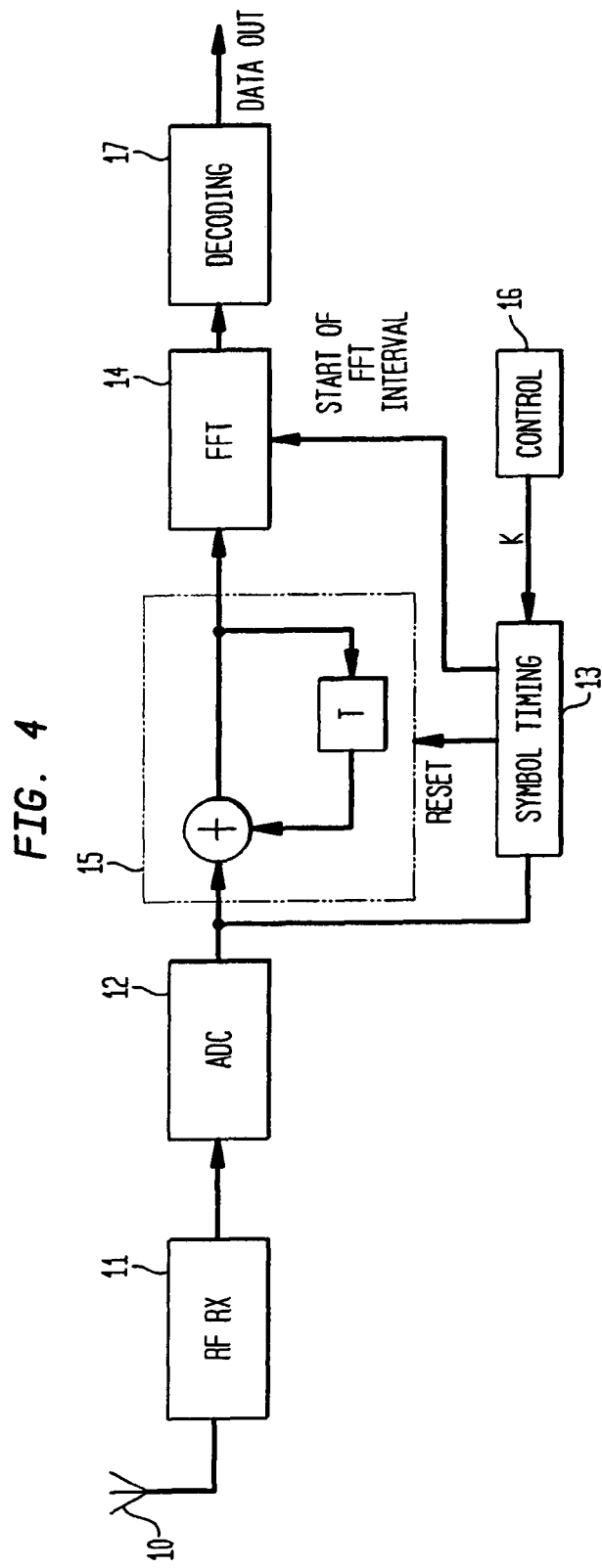
FIG. 4 shows, in block schematic form, a receiver embodying the invention.

With particular reference to FIG. 4, the transmitted OFDM signal is received by an OFDM receiver through an antenna 10. The OFDM signal is processed (down-converted) using the receive circuitry 11. The processed OFDM signal is input into an analog-to-digital converter 12. The digital OFDM signal is received by a symbol timing circuit 13 which acquires the OFDM symbol timing and provides a timing signal to a Fast Fourier Transform (FFT) block 14 and an integrate and dump filter 15. The integrate and dump filter 15 sums K samples that are separated by T seconds. The memory of the filter which consists of a delay line of M samples, where M is the FFT size—is cleared at the start of each new symbol. This reset time is indicated by the timing circuit 13 which is already present in a normal OFDM receiver to indicate the start of the FFT interval. A control circuit 16 sets the number of averaging intervals K.

As an alternative implementation, the integrate and dump filter could be placed after the FFT circuit 14 instead of before. In that case, for each symbol, K consecutive FFT outputs are averaged. However, the processing load is increased because the FFT always has to run at the maximum clock rate.

The sequence of symbols produced by the FFT circuit 14 is applied to conventional decoding circuitry 17 to produce the data output signal.

When a fallback rate is used at a rate that is K times lower than the original rate, the above described technique will produce subcarriers each of which has a bandwidth that is K times smaller than the original bandwidth. Thus, although the total signal bandwidth does not substantially change, the bandwidth of each subcarrier does become smaller. This makes it possible to do frequency division multiple access of up to K users in the same band. Each user has to shift its carrier frequency by a different multiple of 1/KT in order to stay orthogonal to the other users. As an example, when 64 subcarriers are used with a subcarrier spacing of 1 MHz, then it is possible to accommodate 4 users in the same channel when using a fallback rate with K=4. All 4 users use the same transmission and reception scheme as described above, but their carrier frequencies have an offset of 0, 250, 500 and 750 kHz, respectively, or, in general, n/KT, where the values of n are different MODULO K.

As discussed in VN, the control circuits 4, 16 may be responsive to external settings and/or the results of monitoring the signal quality. As also discussed in VN, it may be appropriate to use different modes for the up-links and the down-links in a communications system.

The invention claimed is:

1. A transmitter for transmitting an orthogonal frequency division multiplex (OFDM) communication signal, the transmitter comprising:
    apparatus that transmits an OFDM signal using a set of sub-carriers which are orthogonal over a time T, symbols being expressed by superpositions of the sub-carriers, the apparatus configured to selectively operate in one of a plurality of signaling modes in each of which duration of each of the symbols is KT, where K is a positive integer, and different ones of the plurality of signaling modes have different values of K and the same set of sub-carriers, there being guard times associated with the symbols, guard time lengths being greater for signaling modes having a greater value of K.

2. The transmitter as claimed in claim 1 including a circuit to receive the superpositions of the sub-carriers expressing the symbols and to derive a K-fold repetition in time of each said superposition.

3. The transmitter as claimed in claim 1 further including a cyclic prefixer block that copies a last portion of the symbol, the copy of a last portion of the symbol being transmitted during the guard time.

4. The transmitter as claimed in claim 1 including a coding circuit that receives a stream of bits and partitions the stream into groups of bits.

5. The transmitter as claimed in claim 4 including a forward error correction circuit that introduces forward error correction coding into the groups of bits.

6. The transmitter as claimed in claim 1 including an inverse Fourier transform circuit that performs an inverse Fourier transform of the superpositions of the sub-carriers.

7. The transmitter as claimed in claim 6 wherein a period of the inverse Fourier transform is the time T.

8. The transmitter as claimed in claim 7 wherein the symbol is formed from K repetitions of results of the inverse Fourier transform.

9. The transmitter as claimed in claim 8 wherein K=2.

10. The transmitter as claimed in claim 9 including a transmitter front-end operably coupled to the digital to analog converter, the transmitter front end converting the baseband waveform to a waveform at an RF carrier frequency to form the OFDM signal for transmission by the transmitter.

11. The transmitter as claimed in claim 6 including a digital to analog converter operably coupled to the inverse Fourier transform circuit to provide a baseband waveform comprising the superpositions of sub-carriers.

12. The transmitter as claimed in claim 11 further including an antenna for transmitting the OFDM signal.

13. The transmitter as claimed in claim 1 wherein one of the plurality of signaling modes is a normal mode and another of the plurality of signaling modes is a fallback mode.

14. The transmitter as claimed in claim 1 wherein the length of said guard time is $KT_G$ where $T_G$ is the same for all of the said signaling modes.

15. The transmitter as claimed in claim 1 wherein the guard time is interposed between successive symbols.

16. The transmitter as claimed in claim 1 wherein the guard time is prefixed to the symbols.

17. A method of transmitting an orthogonal frequency division multiplex (OFDM) communication signal, the method comprising:
    transmitting an OFDM signal using a set of sub-carriers which are orthogonal over a time T, symbols being expressed by superpositions of the sub-carriers;
    selectively operating in one of a plurality of signaling modes in each of which duration of each of the symbols is KT where K is a positive integer and ones of the plurality of signaling modes have different values of K and the same set of sub-carriers; and
    providing guard times in association with the symbols, guard time lengths being greater for signaling modes having a greater value of K.

18. The method of transmitting as claimed in claim 17 including:
    receiving the superpositions of the sub-carriers expressing the symbols; and
    deriving a K-fold repetition in time of each superposition.

19. The method of transmitting as claimed in claim 17 further including:
    copying a last portion of the symbol; and
    transmitting the copy of a last portion of the symbol during the guard time.

20. The method of transmitting as claimed in claim 17 further including:
    partitioning a stream of bits into groups of bits, each group of bits forming a symbol.

21. The method of transmitting as claimed in claim 20 further including:
    introducing forward error correction coding into the groups of bits.

22. The method of transmitting as claimed in claim 17 further including:
    performing an inverse Fourier transform on the superpositions of sub-carriers.

23. The method of transmitting as claimed in claim 22 wherein a period of the inverse Fourier transform is the time T.

24. The method of transmitting as claimed in claim 23 wherein the symbol is formed from K repetitions of results of the inverse Fourier transform.

25. The method of transmitting as claimed in claim 24 wherein K=2.

26. The method of transmitting as claimed in claim 22 further including:
    performing a digital to analog conversion to produce a baseband waveform signal.

27. The method of transmitting as claimed in claim 26 further including:
    converting the baseband waveform to a waveform at an RF carrier frequency to form the OFDM signal; and
    transmitting the OFDM signal over an antenna.

28. The method of transmitting as claimed in claim 17 wherein one of the plurality of signaling modes is a normal mode and another of the plurality of signaling modes is a fallback mode.

29. The method of transmitting as claimed in claim 17 wherein the length of the guard time is $KT_G$ where $T_G$ is the same for all of the signaling modes.

30. The method of transmitting as claimed in claim 17 wherein the guard time is interposed between successive symbols.

31. The method of transmitting as claimed in claim 17 wherein the guard time is prefixed to the symbols.

32. A transmitting system comprising:
    an orthogonal frequency division multiplex (OFDM) transmitter selectively operable in a plurality of modes, each of the plurality of modes employing the same set of sub-carriers, which are orthogonal over a time T, the transmitter comprising:
    a coding circuit that forms symbols from groups of bits;
    an inverse Fourier transform circuit, operably coupled to the coding circuit, that performs an inverse Fourier transform on said symbols to produce OFDM symbols; and
    another circuit, operably coupled to the inverse Fourier transform circuit, capable of switching between a first mode having a guard time $T_G$ and an OFDM symbol duration T, and a second mode having a guard time $KT_G$ and an OFDM symbol duration KT, where K is a positive integer greater than 1.

33. The transmitting system as claimed in claim 32, wherein the coding circuit maps N symbols onto N orthogonal sub-carriers.

34. The transmitting system as claimed in claim 33 wherein the coding circuit introduces forward error correction coding into the groups of bits.

35. The transmitting system as claimed in claim 32, wherein a period of the inverse Fourier transform is the OFDM symbol duration T.

36. The transmitting system as claimed in claim 32 including a digital to analog converter operably coupled to the output of the another circuit.

37. The transmitting system as claimed in claim 36 including a transmitter front-end that converts a baseband waveform to a waveform at an RF carrier frequency for transmission by the transmitter.

38. The transmitting system as claimed in claim 37 further including an antenna for transmitting the waveform at the RF carrier frequency.

39. The transmitting system as claimed in claim 32 further including a cyclic prefixer block that copies a last portion of the symbol, the copy of a last portion of the symbol being transmitted during the guard time.

40. The transmitting system as claimed in claim 32 further including control circuitry responsive to results of monitoring signal quality.

41. The transmitting system as claimed in claim 32, wherein the another circuit is capable of deriving a K-fold repetition of each OFDM symbol of duration T to form an OFDM symbol of duration KT.

42. The transmitting system as claimed in claim 32, wherein the another circuit is a prefix and window circuit.

43. The transmitting system as claimed in claim 42, wherein the prefix and window circuit performs windowing by applying a gradual roll-off pattern.

44. The transmitting system as claimed in claim 32, wherein, in the second mode, the another circuit provides K−1 copies of the OFDM symbol of length T in order to form an OFDM symbol of length KT.

45. The transmitting system as claimed in claim 32 wherein K=2 in the second mode such that the guard time in the second mode is twice the length of the guard time in the first mode.

46. The transmitting system as claimed in claim 32 wherein the guard time is interposed between successive OFDM symbols.

47. The transmitting system as claimed in claim 32 wherein the guard time is prefixed to the OFDM symbols.

48. A method of transmitting an orthogonal frequency division multiplex (OFDM) communication signal, the method being selectively operable in a plurality of modes, the method comprising:
   forming symbols from groups of bits;
   performing an inverse Fourier transform on said symbols to produce OFDM symbols; and
   selectively switching between a first mode having a guard time $T_G$ and an OFDM symbol duration T, and a second mode having a guard time $KT_G$ and an OFDM symbol duration KT, where K is a positive integer greater than 1, the first and second modes employing the same set of sub-carriers, which are orthogonal over a time T.

49. The method of transmitting as claimed in claim 48, further including:
   providing N orthogonal sub-carriers; and
   mapping N symbols onto the N orthogonal sub-carriers.

50. The method of transmitting as claimed in claim 49 further including:
   introducing forward error correction coding into the groups of bits.

51. The method of transmitting as claimed in claim 50 wherein a period of the inverse Fourier transform is the OFDM symbol duration T.

52. The method of transmitting as claimed in claim 48 further including:
   performing a digital to analog conversion of the OFDM symbols.

53. The method of transmitting as claimed in claim 52 further including:
   transmitting the OFDM symbols at an RF carrier frequency over an antenna.

54. The method of transmitting as claimed in claim 48 further including:
   copying a last portion of the OFDM symbol; and
   transmitting the copy of the a last portion of the OFDM symbol during the guard time.

55. The method of transmitting as claimed in claim 48 further including:
   windowing the OFDM symbol by applying a gradual roll-off pattern.

56. The method of transmitting as claimed in claim 55 further including:
   monitoring a quality of an OFDM signal and controlling the windowing responsive to the results of the monitoring.

57. The method of transmitting as claimed in claim 48 further including:
   receiving superpositions of the sub-carriers expressing the OFDM symbols; and
   deriving a K-fold repetition of each superposition to form another OFDM symbol.

58. The method of transmitting as claimed in claim 48, wherein, in the second mode, the function provides K−1 copies of an OFDM symbol of length T in order to form an OFDM symbol of length KT.

59. The method of transmitting as claimed in claim 48, wherein, in the second mode, each OFDM symbol is prefixed with K−1 copies of the OFDM symbol.

60. The method of transmitting as claimed in claim 48 wherein K=2 in the second mode such that the guard time in the second mode is twice the length of the guard time in the first mode.

61. The method of transmitting as claimed in claim 48 wherein the guard time $T_G$ is interposed between successive OFDM symbols.

62. The method of transmitting as claimed in claim 48 wherein the guard time $T_G$ is prefixed to the OFDM symbols.

63. An orthogonal frequency division multiplex (OFDM) transmitter comprising:
   means for transmitting an OFDM signal using a set of sub-carriers which are orthogonal over a time T, symbols being expressed by superpositions of the sub-carriers;
   means for selectively operating in one of a plurality of signaling modes in each of which duration of each of the symbols is KT where K is a positive integer and ones of the plurality of signaling modes have different values of K and the same set of sub-carriers; and
   means for providing guard times in association with the symbols, guard time lengths being greater for signaling modes having a greater value of K.

64. An orthogonal frequency division multiplex (OFDM) transmitter comprising:
   means for forming symbols from groups of bits;
   means for performing an inverse Fourier transform on said symbols to produce OFDM symbols; and
   means for switching between a first mode having a guard time $T_G$ and an OFDM symbol duration T, and a second mode having a guard time $KT_G$ and an OFDM symbol duration KT, where K is a positive integer greater than 1, the first and second modes employing the same set of sub-carriers, which are orthogonal over a time T.

* * * * *